United States Patent
Basturk

(10) Patent No.: US 6,587,399 B2
(45) Date of Patent: Jul. 1, 2003

(54) TWO-COLOR LIQUID CRYSTAL DISPLAY ASSEMBLY

(75) Inventor: Naci Basturk, Enges (CH)

(73) Assignee: Asulab S.A., Marin (CH)

( * ) Notice: Subject to any disclaimer, the term of this patent is extended or adjusted under 35 U.S.C. 154(b) by 106 days.

(21) Appl. No.: 09/939,642

(22) Filed: Aug. 28, 2001

(65) Prior Publication Data

US 2002/0048221 A1 Apr. 25, 2002

(30) Foreign Application Priority Data

Sep. 14, 2000 (EP) .......................... 00203169

(51) Int. Cl.⁷ .................. G04C 19/00; G04C 17/00; G02F 1/1335
(52) U.S. Cl. ............... 368/84; 368/242; 345/88; 349/67; 349/96; 349/97; 349/114
(58) Field of Search .................. 348/82, 84, 239, 348/242; 345/88, 96–100, 104–108, 113–115; 349/62–65, 69, 96, 98, 113, 114

(56) References Cited

U.S. PATENT DOCUMENTS 6,147,937 A * 11/2000 Arikawa et al. ........... 368/242
6,437,840 B1 * 8/2002 Arikawa et al. ............ 349/62

FOREIGN PATENT DOCUMENTS

| EP | 0 930 522 A1 | 7/1999 |
| EP | 0 942 313 A1 | 9/1999 |
| EP | 0 996 025 A1 | 4/2000 |
| WO | WO 99/32945 A | 7/1999 |

OTHER PUBLICATIONS

Patent Abstracts of Japan, vol. 013, No. 517 (P–962), Nov. 20, 1989 and JP 01 210931 A, Optrex Corp., Aug. 24, 1989.
Patent Abstracts of Japan, vol. 2000, No. 09, Oct. 13, 2000, & JP 2000 180847, Seiko Epson Corp., Jun. 30, 2000 & Database WPI, Week 100044, Derwent Publications Ltd., London, GB, AN 2000–493866, XP002160644.

* cited by examiner

Primary Examiner—Vit Miska
(74) Attorney, Agent, or Firm—Griffin & Szipl, P.C.

(57) ABSTRACT

The assembly includes on the one hand a first device I determining a first color, said device being formed of a liquid crystal display module (CL; $CL_1$, $CL_2$), including at the front and at the back a linear polarizer ($PAb_1$, $PAb_2$) selective of said first color, and on the other hand a second device II including a colored filter (Fy) corresponding to the second color. The assembly is characterised in that the axes of polarization of the selective polarizers ($PAb_1$, $PAb_2$) are parallel to each other, in that the colored filter (Fy) includes at the front a reflective polarizer ($PR_1$) whose axis of polarization is parallel to the axes of polarization of the two polarizers ($PAb_1$, $PAb_2$), and at the back a reflective element (R, $PR_2$), and in that a control unit (7) enables a switching configuration to be defined displaying an item of information in the first color on a background corresponding to the second color or vice versa.

18 Claims, 2 Drawing Sheets

TWO-COLOR LIQUID CRYSTAL DISPLAY ASSEMBLY

The present invention concerns a two-colour crystal display assembly allowing a high contrast and purity of colour to be obtained by a particular arrangement of the different elements forming the display assembly.

The invention allows the information provided by any type of electronic apparatus to be made easier to read and more attractive, in particular the time-related and non-time-related information provided by a timepiece.

With reference for example to the chapter by T. J. Scheffer entitled "Liquid crystal color display" in the work on "Non emissive Electrooptic Display" (1976, editors A. R. Kmetz and F. K. von Willisen), arrangements allowing information to be displayed in a first colour on a background of a second colour are known. In order to be easy to read, it is desirable to have a high contrast, which can ideally be obtained when the first and second colours are complementary colours such as green and red or yellow and blue.

In the known constructions of the prior art, the display assembly basically includes, starting from the side of the observer or viewer, an information display module, on either side of which are arranged two linear polarisers at least one of which is selective of the first colour, a coloured filter corresponding to the second colour and a metal reflector at the back. As will be explained in more detail hereinafter, such an arrangement prevents the first and second colours from being perfectly independent, so that there will be for example a yellow display on a green background using a blue selective polariser and a yellow filter.

Conversely, still within the hypothesis of one or several blue selective polarisers and a yellow filter, the present invention enables a yellow display to be obtained on a brilliant blue background.

The invention therefore concerns a two-colour display assembly including a first device determining a first colour and a second device determining a second colour. The first device is formed of a liquid crystal display module, the switching configurations of which are determined by an electronic control unit powered by an energy source, said display module including two linear polarisers disposed at the front and the back of said module and at least one of which is selective of a first colour. The second device includes a coloured filter determining the second colour. The display assembly is characterised in that the axes of polarisation of the polarisers of the first device are parallel to each other, in that the coloured filter of the second device includes at the front a reflective polariser whose axis of polarisation is parallel to the axes of polarisation of the two polarisers of the first device, and at the back a reflective element and in that the control unit enables a switching configuration to be defined displaying an item of information in the first colour on a background corresponding to the second colour or vice versa.

As will be shown in the detailed description, this precise arrangement of all the constituent elements of the display assembly according to the invention, enables the first and second colours to be independent with very high efficiency, i.e. a high colour purity to be obtained, which contributes to increasing the contrast and thus allows, in particular, the displayed information to be read more easily.

The reflective element of the second display may be a metal reflector which will reflect all of the incident light, a transflective reflector which will only partially reflect or a reflective polariser crossed with the reflective front polariser which will allow part of the incident light to pass. In this latter case, the light going beyond the reflective element will allow a second display placed at the back of the second device to be made visible. Conversely, in these two latter cases, it will be possible to place a light source (diode, electroluminescent sheet, etc.) at the back of the second device, which will increase the luminosity of the display, for example in night vision.

As will be seen hereinafter, the two polarisers of the first display can both be polarisers selective of the first colour.

The liquid crystal display module may be formed by a single matrix display cell or a liquid crystal segment cell. This display module can also have a more complex structure, for example formed by an optical valve and by a matrix or segment cell to allow contrast inversion, as will be shown in the following examples.

Other features, advantages and variants of the present invention will appear upon reading the description of a timepiece taken by way of illustrative and non-limiting example of an application of a display according to the invention, with reference to the annexed drawings, in which.

Figure 3:
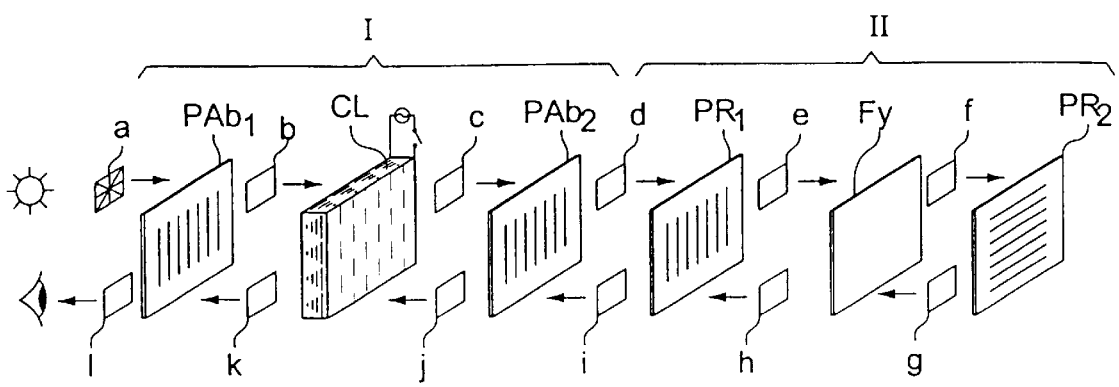
FIG. 3 is a schematic diagram of the operation of a first embodiment of the display assembly according to the invention, for a first switching state.
Figure 4:
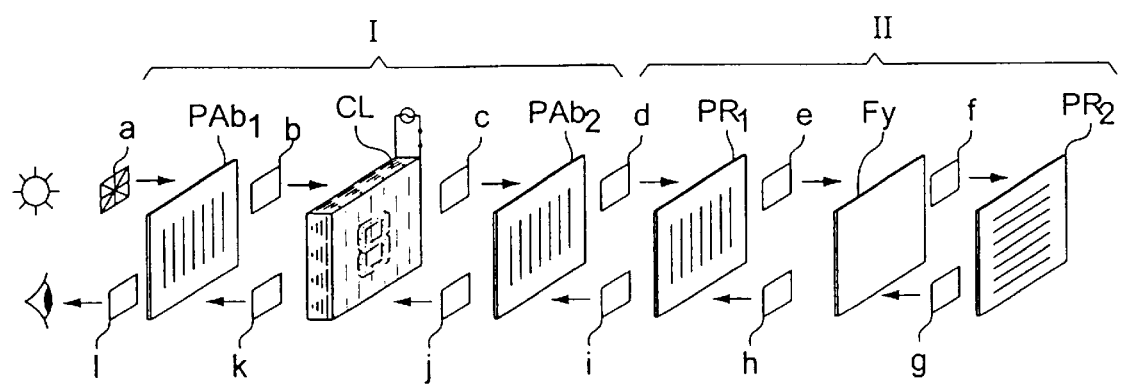

FIG. 4 corresponds to FIG. 3 for a second switching state; and

Figure 5:
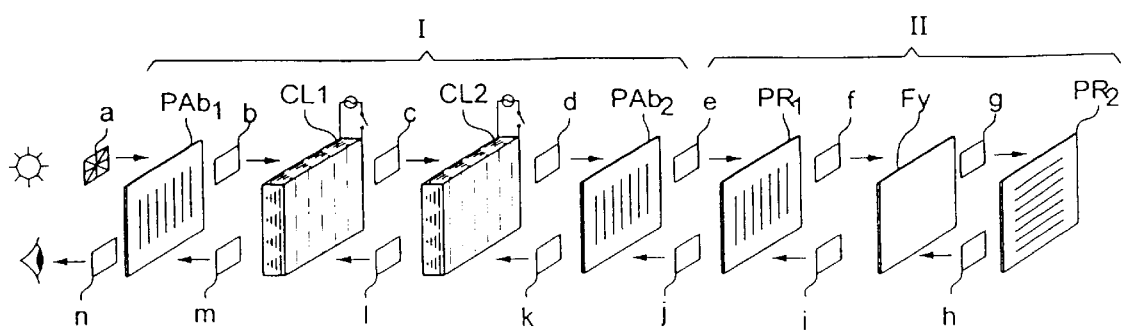

FIG. 5 is a schematic diagram of the construction and operation of a second embodiment of the display assembly according to the invention.

Figure 1:
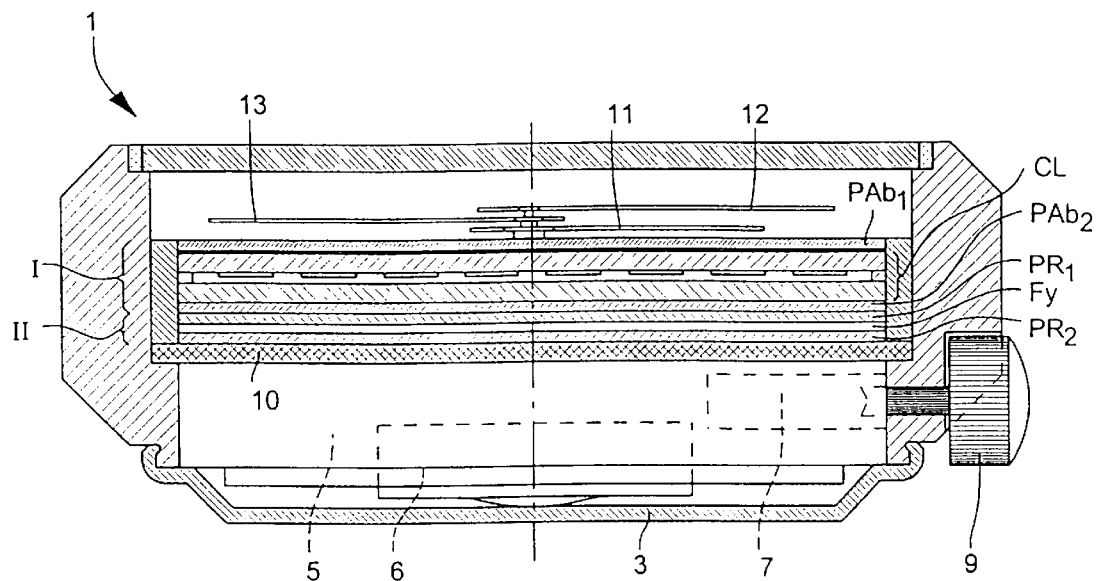
FIG. 1 is a cross-section of a wristwatch including a display assembly according to the invention.

The watch shown in FIG. 1, designated by the general reference 1, conventionally includes a middle part 2, a back cover 3 and a crystal 4, together delimiting a case in the bottom part of which is arranged an electronic watch movement 5 powered by an energy source 6, such as a button type battery. Movement 5 includes an electronic time-keeping circuit associated with a drive device (not shown) for the hour, minute, second hands 11, 12, 13 moving above a dial 10 bearing hour symbols (not shown).

Between dial 10 and crystal 4 there is a two-colour display assembly including a first device I determining a first colour, and a second device 11 determining a second colour. Each device is formed by superposing different elements the thickness of which has been greatly exaggerated in FIG. 1 for improved comprehension.

For improved comprehension of the invention, a two-colour display assembly according to the prior art will first be described, the constituent elements of which are shown schematically in FIG. 2.

First device I includes, starting from the exterior, an absorbent linear polariser $PAb_1$. which is selective of a first colour B, for example blue, a liquid crystal display module CL and a second absorbent linear polariser $PAb_2$ which is selective of the same first colour B and whose axis of polarisation is parallel to the axis of polarisation of first polariser $PAb_1$. In the example shown, the display module is simply formed by a matrix or segment liquid crystal cell whose switching state is determined by an electronic control unit 7, connected to an energy source 6 and receiving instructions as a function of manipulations on at least a control member 9. In the following description, the liquid crystals filling cell CL are of the twisted nematic (TN) type with positive anisotropy, but it is clear that those skilled in the art can, without departing from the scope of the invention, use TN liquid crystals with negative anisotropy, or use other types of liquid crystals, such as two frequency liquid crystals. Second device If includes a filter Fy determining a second colour Y, for example yellow, at the back of which is arranged a metal reflector R for example formed by a sheet of metal or by a metallised substrate.

In order to understand the working of a two-colour display assembly according to the prior art, the properties of the different constituent elements should first be recalled, or more exactly the imperfect nature of the elements selective of a determined colour. For simplification, in the following description, only the blue component B and the yellow component Y are kept in the white non-polarised incident light represented by the square a, assuming also that a non-polarised light is formed by 50% polarisation along a first axis and 50% polarisation along an axis perpendicular to the first one. Taking account of these hypotheses, a blue selective absorbent linear polariser PAb receiving a non-polarised blue monochromatic light will transmit 50% polarised light along its axis of polarisation and 50x % polarised along a perpendicular axis; if the blue incident light is polarised along its axis, it will transmit 100% of it along the same axis; if the light is polarised along a perpendicular axis, it will transmit x % of it (without modifying the axis of polarisation). If the incident light is a non-polarised yellow monochromatic light, the blue selective linear polariser will transmit y % of it along its axis of polarisation 50t % of it along a perpendicular axis; if the yellow incident light is polarised along its axis it will transmit z % of it and if it is polarized along a perpendicular axis it transmits t % of it (without modifying the axis of polarisation). For the preceding coefficients, it is possible to retain the following values: x=5%, y= 40%, z=89% and t=1%, these values being able to vary as a function of the more or less perfect nature of a colour selective absorbent linear polariser. It will be noted finally that a coloured filter is generally imperfect: a yellow filter Fy transmits 100% yellow light, but also w % polarised or non-polarised blue light, the value of coefficient w being able to be evaluated at 15%.

Figure 2:
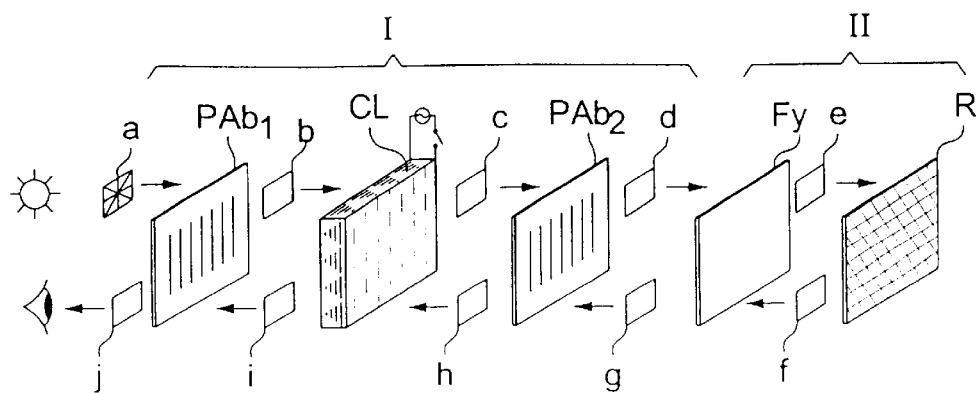
FIG. 2 is a schematic diagram of an operating mode according to the prior art.

FIG. 2 shows, after each passage of an element of the construction, a square numbered from b to i representing in intensity and polarisation the state of a blue "B" or yellow "Y" monochromatic beam. The attenuation and polarisation values are given in table 1 hereinafter for each colour as a function of an OFF switching configuration of cell CL, in which the liquid crystal selected causes the polarised light to undergo a rotation of 90° and as a function of the ON switching configuration which does not modify its axis of polarisation. The last three lines indicate respectively:

the attenuation coefficient of each colour in the ON/OFF switching configurations;

the B/Y or Y/B ratio determining the dominant colour, or conversely the mixture thereof, and the value of the preceding ratio for the previously indicated coefficients.

TABLE I

| | | OFF | | | | ON | | | |
|---|---|---|---|---|---|---|---|---|---|
| $PAb_1\updownarrow$ | a | B* | | Y* | | B* | | Y* | |
| CL | b | $0,5\updownarrow$ | $0,5x\leftrightarrow$ | $y\updownarrow$ | $0,5t\leftrightarrow$ | $0,5\updownarrow$ | $0,5x\leftrightarrow$ | $y\updownarrow$ | $0,5t\leftrightarrow$ |
| $PAb_2\updownarrow$ | c | $0,5\leftrightarrow$ | $0,5x\updownarrow$ | $y\leftrightarrow$ | $0,5t\updownarrow$ | $0,5\updownarrow$ | $0,5x\leftrightarrow$ | $y\updownarrow$ | $0,5t\leftrightarrow$ |
| Fy | d | $0,5x\leftrightarrow$ | $0,5x\updownarrow$ | $yt\leftrightarrow$ | $0,5tz\updownarrow$ | $0,5\updownarrow$ | $0,5x^2\leftrightarrow$ | $yz\updownarrow$ | $0,5t^2\leftrightarrow$ |
| R | e | $0,5wx\leftrightarrow$ | $0,5wx\updownarrow$ | $yt\leftrightarrow$ | $0,5tz\updownarrow$ | $0,5w\updownarrow$ | $0,5wx^2\leftrightarrow$ | $yz\updownarrow$ | $0,5t^2\leftrightarrow$ |
| Fy | f | $0,5wx\leftrightarrow$ | $0,5wx\updownarrow$ | $yt\leftrightarrow$ | $0,5tz\updownarrow$ | $0,5w\updownarrow$ | $0,5wx^2\leftrightarrow$ | $yz\updownarrow$ | $0,5t^2\leftrightarrow$ |
| $PAb_2\updownarrow$ | g | $0,5w^2x\leftrightarrow$ | $0,5w^2x\updownarrow$ | $yt\leftrightarrow$ | $0,5tz\updownarrow$ | $0,5w^2\updownarrow$ | $0,5w^2x^2\leftrightarrow$ | $yz\updownarrow$ | $0,5t^2\leftrightarrow$ |
| CL | h | $0,5w^2x^2\leftrightarrow$ | $0,5w^2x\updownarrow$ | $yt^2\leftrightarrow$ | $0,5tz^2\updownarrow$ | $0,5w^2\updownarrow$ | $0,5w^2x^3\leftrightarrow$ | $yz^2\updownarrow$ | $0,5t^3\leftrightarrow$ |
| $PAb_1\updownarrow$ | i | $0,5w^2x^2\updownarrow$ | $0,5w^2x\leftrightarrow$ | $yt^2\updownarrow$ | $0,5tz^2\leftrightarrow$ | $0,5w^2\updownarrow$ | $0,5w^2x^3\leftrightarrow$ | $yz^2\updownarrow$ | $0,5t^3\leftrightarrow$ |
| atten. | j | $0,5w^2x^2\updownarrow$ | $0,5w^2x^2\leftrightarrow$ | $yzt^2\updownarrow$ | $0,5t^2z^2\leftrightarrow$ | $0,5w^2\updownarrow$ | $0,5w^2x^4\leftrightarrow$ | $yz^3\updownarrow$ | $0,5t^4\leftrightarrow$ |
| coeff. | | $w^2x^2$ | | $zt^2(y+0,5z)$ | | $0,5w^2(1+x^4)$ | | $yz^3+0,5t^4$ | |
| $\frac{B}{Y}$ or $\frac{Y}{B}$ | | $\frac{B}{Y}=\frac{w^2x^2}{zt^2(y+0,5z)}$ | | | | $\frac{Y}{B}=\frac{yz^3+0,5t^4}{0,5w^2(1+x^4)}$ | | | |
| value | | 0,70 | | | | 18,20 | | | |

By way of explanation, the way in which attenuation of the colour blue "B" is established in the OFF state is indicated hereinafter. At "b", after the passage through polariser PAb1, there is a component parallel to the axis of the polariser with an attenuation of 0.5 and a perpendicular component with an attenuation of 0.5x. If the parallel component is considered, it undergoes at "c", after the passage through cell CL, a rotation of 90° without attenuation; at "d" an attenuation X bringing the value at 0.5x given that it has passed through polariser $PAb_2$ with a polarisation perpendicular to the axis of the latter; at "e" after the passage through the yellow filter Fy, it undergoes a new attenuation w bringing the value at 0.5wx; at "f" it is reflected by reflector R without modification; on the return travel it undergoes new attenuations w at "g" and x at "h", so that it arrives at "j" by the observer with a global attenuation of $0.5w^2x^2$. By following the same path for the component at "b" perpendicular to the axis of polariser $PAb_1$, it can be seen that it reaches "j" by the observer with a global attenuation of $0.5w^2x^2$. The meeting of these two components for the colour blue "B" thus leads to a global attenuation coefficient of $w^2x^2$. By following the path of the colour yellow Y in the same way in the OFF state, one reaches a global attenuation coefficient which can be expressed as $zt^2(y+0.5z)$. If the attenuation coefficient ratio for each colour is now effected, with the value indicated at the beginning a value of 0.70 is obtained for the B/Y ratio. This means that the colours blue and yellow are substantially in the same proportion and that the display will thus appear in green in the OFF state.

If the ON state is now considered, i.e. the state in which the switched segments of cell CL do no modify the axis of polarisation, it can be established that the global attenuation of the colour blue B can be expressed as $0.5w^2(1+x^4)$ and that of the colour yellow Y as $yz^3+0.5t^4$. By effecting the attenuation coefficient ratios for each colour as before, a value of 18.20 is obtained for the Y/B ratio, i.e. a dominant yellow colour.

From the foregoing, it is clear that the displayed information will appear in yellow on a green background, i.e. without obtaining sufficient contrast between the two initial colours.

With reference more particularly now to FIGS. 3 and 4, one will show how the display assembly according to the invention allows the purity of the colours and the contrast to be very efficiently increased. In the example shown, this assembly includes at the front a first device I formed by a liquid crystal display module, on either side of which are arranged two absorbent linear polarisers $PAb_1$ and $PAb_2$ which are selective of a first colour, for example blue "B", the axes of polarisation of the two polarisers being parallel to each other, and at the back a second device II determining a second colour, for example yellow "Y". This second device II includes at the front, i.e. on the side of first device I, a first reflective polariser $PR_1$, having an axis of polarisation parallel to the axes of polarisation of the two polarisers of the first device 1, then a filter Fy, which is selective of the second colour "Y" and at the back a second reflective polariser $PR_2$ whose axis of polarisation is perpendicular to the axis of polarisation of front reflective polariser $PR_1$. In order to allow a comparison with the construction of the prior art, the same liquid crystal cell as before was used and it is assumed that the attenuation coefficients of the selective absorbent linear polarisers $PAb_1$ and $PAb_2$ and of coloured filter Fy also have the same values as before.

First, for the purpose of simplification, it is assumed that the reflective polarisers $PR_1$ and $PR_2$ are perfect, i.e. they are totally transparent to a light polarised parallel to their axis of polarisation and that conversely they reflect totally a light polarised perpendicular to their axis. In reality, the reflective polarisers are also imperfect and a fraction of light polarised perpendicular to their is transmitted, and can allow an element placed at the back to be made visible.

With reference now to table II, the path of each colour B and Y will be followed, in each OFF switching configuration shown in FIG. 3 and ON configuration shown in FIG. 4.

TABLE II

| $PAb_1$ ↕ | a | OFF | | | | ON | | | |
|---|---|---|---|---|---|---|---|---|---|
| | | B* | | Y* | | B* | | Y* | |
| CL | b | 0, 5 ↕ | 0, 5x ↔ | y ↕ | 0, 5t ↔ | 0, 5 ↕ | 0, 5x ↔ | y ↕ | 0, 5t ↔ |
| $PAb_2$ ↕ | c | 0, 5 ↔ | 0, 5x ↕ | y ↔ | 0, 5t ↕ | 0, 5 ↕ | 0, 5x ↔ | y ↕ | 0, 5t ↔ |
| $PR_1$ ↕ | d | 0, 5x ↔ | 0, 5x ↕ | yt ↔ | 0, 5zt ↕ | 0, 5 ↕ | 0, 5x² ↔ | yz ↕ | 0, 5t² ↔ |
| Fy | e | X | 0, 5x ↕ | X | 0, 5zt ↕ | 0, 5 ↕ | X | yz ↕ | X |
| $PR_2$ ↔ | f | X | 0, 5xw ↕ | X | 0, 5zt ↕ | 0, 5w ↕ | X | yz ↕ | X |
| Fy | g | X | 0, 5xw ↕ | X | 0, 5zt ↕ | 0, 5w ↕ | X | yz ↕ | X |
| $PR_1$ ↕ | h | X | 0, 5xw² ↕ | X | 0, 5zt ↕ | 0, 5w² ↕ | X | yz ↕ | X |
| $PAb_2$ ↕ | i | 0, 5x ↔ | 0, 5xw² ↕ | yt ↔ | 0, 5zt ↕ | 0, 5w² ↕ | 0, 5x² ↔ | yz ↕ | 0, 5t² ↔ |
| CL | j | 0, 5x² ↔ | 0, 5xw² ↕ | yt² ↔ | 0, 5z²t ↕ | 0, 5w² ↕ | 0, 5x³ ↔ | yz² ↕ | 0, 5t² ↔ |
| $PAb_1$ ↕ | k | 0, 5x² ↕ | 0, 5xw² ↔ | yt² ↕ | 0, 5z²t ↔ | 0, 5w² ↕ | 0, 5x³ ↔ | yz² ↕ | 0, 5t³ ↔ |

TABLE II-continued

| | | OFF | | | ON | | |
|---|---|---|---|---|---|---|---|
| $PAb_1 \updownarrow$ | a | B* | | Y* | B* | | Y* |
| atten. | 1 | $0,5x^2 \updownarrow$ | $0,5x^2w^2 \leftrightarrow$ | $yzt^2 \updownarrow \quad 0,5z^2t^2 \leftrightarrow$ | $0,5w^2 \updownarrow$ | $0,5x^4 \leftrightarrow$ | $yz^3 \updownarrow \quad 0,5t^4 \leftrightarrow$ |
| coeff. | | $0,5x^2(1+w^2)$ | | $zt^2(y+0,5z)$ | $0,5(w^2+x^4)$ | | $yz^3 + 0,5^4$ |
| $\dfrac{B}{Y}$ or $\dfrac{Y}{B}$ | | $\dfrac{B}{Y} = \dfrac{0,5x^2(1+w^2)}{zt^2(y+0,5z)}$ | | | $\dfrac{Y}{B} = \dfrac{yz^3+0,5t^4}{0,5(w^2+x^4)}$ | | |
| value | | 19,97 | | | 22,04 | | |

If the colour blue "B" is considered in the OFF state keeping only the component polarised parallel to the axis of polariser $PAb_1$ at "b", with an attenuation of 0.5, it can be seen that at "c", after cell CL, it has undergone a rotation of 90°, at "d", with its axis parallel to the axis of polarisation of polariser $PAb_2$ it has undergone an attenuation x bringing its value at 0.5x, it axis of polarisation then being perpendicular to that of the reflective polariser, it is reflected without modification at "i" to undergo, after the passage through polariser $PAb_2$ another attenuation x bringing the global attenuation value at $0.5x^2$ a new rotation of 90° is impose by cell CL "k", polariser $PAb_1$ is passed through without modification so that the observer at "l" sees the colour blue with an attenuation coefficient able to be expressed as $0.5x^2$. By effecting the same "path" for the second blue component "B" in the OFF state and for the colours blue "B" and yellow "Y" in the ON state, one can determine, as indicated in Table II, a global attenuation coefficient and a ratio of these coefficients B/Y or Y/B defining the dominant colour, for each colour in each switching state. With the attenuation values indicated at the beginning, one obtains a ratio B/Y#20, i.e. a clearly blue dominant colour for the background in the OFF state, and in the ON state corresponding to the segments of the display, a ratio Y/B#22, i.e. a clearly yellow dominant colour, and finally the display of an item of information with the optimum yellow contrast on a blue background. It will be observed that the attenuation coefficient of the yellow colour "Y" in the ON state is the same as that obtained according to the prior art. However, it is easy to see that the attenuation coefficient of the colour blue "B" according to the present invention is 13 times lower than that obtained according to the prior art, i.e. the display assembly allows a much purer blue colour to be obtained.

It is clear that the attenuation coefficients mentioned in Table II allow the dominant colour to be defined but are not representative of the intensity observed, given that account must also be taken of the other wavelengths of the non-polarised natural light and the eye's own sensitivity to each wavelength.

Those skilled in the art can easily retrace the path of the colours B and Y when one of the selective polarisers of the first device is replaced by an absorbent polariser, which is not selective of a determined colour. It is easy to show that a B/Y ratio of 25 is obtained for the background and a Y/B ratio of the order of 29 is obtained for the display itself, i.e. always a yellow display on a brilliant blue background.

It is clear that the example which has just been described with two complementary colours, blue for the selective absorbent linear polarisers and yellow for the coloured filter, can be modified without departing from the scope of the invention, for example by exchanging the colours of the selective polarisers and the filter to provide a blue display on a yellow background, by selecting other complementary colours, for example red and blue to keep a high contrast, and to a lesser extent non-complementary colours.

Upon reading the above description, one might think that the construction elements of the display device according to the invention do not differ much from those which were known in the prior art.

In order to achieve the desired result, it was not, in fact, obvious to discover whether one or more elements had to be added, how to arrange them with respect to the elements of the prior art and/or how to modify said elements of the prior art accordingly. Surprisingly, apart from the arrangement which has just been described, no other arrangement enables high B/Y or Y/B ratios which are close to each other to be obtained for the background and for the information displayed, i.e. great colour purity and high contrast to be obtained.

Following the same steps as described with reference to Tables I and II, the following observations, for example, will be made. If the relative orientation of the two reflective polarisers $PR_1$ and $PR_2$ is permuted, a ratio B/Y=20 will be obtained for the background and Y/B=0.41 for the segments, i.e. a greenish display on a blue background. If the initial arrangement of reflective polarisers $PR_1$ and $PR_2$ is maintained, but polariser $PAb_2$ is rotated through 90°, a ratio B/Y=2.44 will be obtained for the background and Y/B=0.05 for the segments, i.e. a blue display on a greenish background. If the two preceding modification are both made at the same time, a green display on a yellowish background will be obtained.

The other relative orientations of the four polarisers gives back reflective polariser $PR_2$ a passive role, i.e. the polarised incident light passes through it. The effect observed will then depend upon the extent to which an element placed at the back is reflective, i.e. for example the light or dark shade of the dial of a second display. Among the eight possibilities available, only one allows the object of the invention to be achieved, namely when selective linear polarisers $PAb_1$ and $PAb_2$, and front reflective polariser $PR_1$ are arranged with their axes of polarisation parallel to each other and back polariser $PR_2$ is replaced by a light, i.e. reflective, dial.

As was indicated at the beginning, the thicknesses of the display assembly elements have been greatly exaggerated. In reality, this assembly can be designed with a thickness of the order of 1.4 to 1.5 mm with 0.3 mm glass plates for the cell. Coloured filter Fy can be a plastic film, but also simply a coloured lacquer applied to the back face of front reflective polariser $PR_1$ or to the front face of back reflective polariser $PR_2$ or a colouring incorporated in the material of the reflective polariser, i.e. in a way providing a polariser which is both reflective and colour selective. This construction contributes to reducing the thickness of the display assembly and to facilitating the assembly thereof.

In the preceding description, it was implicitly assumed that the two-colour display assembly according to the invention occupied the entire surface of the display. According to a variant, this assembly may occupy only a part of it by selecting a smaller cut out surface area for front reflective polariser $PR_1$ than that of the other constituent elements of the display assembly. It is thus possible to have a blue, green, yellow three-colour display, which may offer additional aesthetic interest.

According to another variant, which may be combined with that indicated above, the liquid crystal display module may have a more complex structure than a simple cell CL. By way of example, FIG. 5 shows the diagram of a display assembly wherein the display module is formed by a matrix or segment liquid crystal cell $CL_1$, identical to that already described, and by a liquid crystal valve $CL_2$ containing for example the same liquid crystals as $CL_1$, cell $CL_1$ and the valve being shown in the OFF state. When valve $CL_2$ is in the ON state, it has no influence on the polarisation of the light which passes through it, and exactly the same visual effect as that described with reference to Table II is thus obtained. However, when valve $CL_2$ is in the OFF state, it will be shown, with reference to Table III hereinafter, that a contrast inversion is also obtained.

TABLE III

| $PAb_1$ ↕ | | OFF | | | | ON | | | |
|---|---|---|---|---|---|---|---|---|---|
| | a | B* | | Y* | | B* | | Y* | |
| CL1 | b | 0,5 ↕ | 0,5x ↔ | y ↕ | 0,5t ↕ | 0,5 ↕ | 0,5x ↔ | y ↕ | 0,5 ↔ |
| CL2 | c | 0,5 ↔ | 0,5x ↕ | y ↔ | 0,5t ↕ | 0,5 ↕ | 0,5x ↔ | y ↕ | 0,5 ↔ |
| $PAb_2$ ↕ | d | 0,5 ↕ | 0,5x ↔ | y ↕ | 0,5t ↕ | 0,5 ↔ | 0,5x ↕ | y ↔ | 0,5t ↕ |
| $PR_1$ ↕ | e | 0,5 ↕ | $0,5x^2$ ↔ | yz ↕ | $0,5t^2$ ↔ | 0,5x ↔ | 0,5x ↕ | yt ↔ | 0,5zt ↕ |
| Fy | f | 0,5 ↕ | X | yz ↕ | X | X | 0,5x ↕ | X | 0,5zt ↕ |
| $PR_2$ ↔ | g | 0,5w ↕ | X | yz ↕ | X | X | 0,5xw ↕ | X | 0,5zt ↕ |
| Fy | h | 0,5w ↕ | X | yz ↕ | X | X | 0,5xw ↕ | X | 0,5zt ↕ |
| $PR_1$ ↕ | i | $0,5w^2$ ↕ | X | yz ↕ | X | X | $0,5xw^2$ ↕ | X | 0,5zt ↕ |
| $PAb_2$ ↕ | j | $0,5w^2$ ↕ | $0,5x^2$ ↔ | yz ↕ | $0,5t^2$ ↔ | 0,5x ↔ | $0,5xw^2$ ↕ | yt ↔ | 0,5zt ↕ |
| CL2 | k | $0,5w^2$ ↕ | $0,5x^3$ ↔ | $yz^2$ ↕ | $0,5t^3$ ↔ | $0,5x^2$ ↔ | $0,5xw^2$ ↕ | $yt^2$ ↔ | $0,5z^2t$ ↕ |
| CL1 | l | $0,5w^2$ ↔ | $0,5x^3$ ↕ | $yz^2$ ↔ | $0,5t^3$ ↕ | $0,5x^2$ ↕ | $0,5xw^2$ ↔ | $yt^2$ ↕ | $0,5z^2t$ ↔ |
| $PAb_2$ ↕ | m | $0,5w^2$ ↕ | $0,5x^3$ ↔ | $yz^2$ ↕ | $0,5t^3$ ↔ | $0,5x^2$ ↕ | $0,5xw^2$ ↔ | $yt^2$ ↕ | $0,5z^2t$ ↔ |
| atten. | n | $0,5w^2$ ↕ | $0,5x^4$ ↕ | $yz^3$ ↕ | $0,5t^4$ ↔ | $0,5x^2$ ↕ | $0,5x^2w^2$ ↔ | $yzt^2$ ↕ | $0,5z^2t^2$ ↔ |
| coeff. | | $0,5(w^2 + x^4)$ | | $yz^3 + 0,5^4$ | | $0,5x^2(1 + w^2)$ | | $zt^2(y + 0,5z)$ | |
| $\frac{B}{Y}$ or $\frac{Y}{B}$ | | | | $\frac{Y}{B} = \frac{yz^3 + 0,5t^4}{0,5(w^2 + x^4)}$ | | | | $\frac{B}{Y} = \frac{0,5x^2(1 + w^2)}{zt^2(y + 0,5z)}$ | |
| value | | | | 18,20 | | | | 19,97 | |

$CL_1$: display; $CL_2$: valve OFF

By way of explanation, the path of the component of yellow light "Y" polarised at "b" parallel to the axis of polariser $PAb_1$ with an attenuation y will be followed in the OFF state as an example. At "c", after the passage through $CL_1$ it undergoes a rotation of 90°, then at "d" after the passage through $CL_2$ another rotation of 90° without attenuation; at "e" it undergoes an attenuation z bringing the total attenuation to yz without modifying the polarisation; at "f" and "g" it passes successively through $PR_1$ and Fy without modification to be reflected at "h" by $PR_2$ and to pass again at "i" through Fy and $PR_1$ in succession without modification over the rest of its path to "n" where it is observed that it has undergone two new attenuations z bringing the total attenuation to $yz^3$. By following the same "path" for the second yellow component and for the two blue components in the OFF state and then for the yellow and blue components Y and B in the ON state, the attenuation coefficients indicated in the Table are obtained. With the attenuation values indicated at the beginning, in the OFF state a ratio Y/B#18 is obtained, i.e. a clearly dominant yellow colour for the background and in the ON state a ratio B/Y#20, i.e. a dominant blue colour for the display segments. Thus by adding an optical valve whose switching state can be changed, an inversion of the two colours can be obtained while still maintaining high contrast and colour purity.

According to another variant which may be combined with the preceding variants, when one has a cell and a valve, it is possible to provide two separate switching zones for the valve so that these zones can have information which can be differentiated by chromatic inversion. "Information" of course means alphanumerical information, but also logos and other designs, in particular when the display is of the matrix type. When a three-colour mode is selected, as indicated previously, this latter example embodiment enables a very wide variety of looks to be provided with very few modifications to the constituent elements of the display assembly.

The two-colour display assembly according to the invention, and its variants can be applied to a large number of products which have to provide visual data on a fixed apparatus, such as a dashboard, or a portable apparatus such as a watch. Taking the watch by way of example, it can be seen as shown in FIG. 1, that the display assembly, whichever embodiment is used, can be supported by dial 10 and surmounted by an analogue display of the current time by means of hands 11, 12 and 13. By being connected to the time base of watch movement 5, the display assembly according to the invention could supply complementary information such as the date, the day of the week etc.; if it is connected to sensors, it could display the data provided by such sensors. As was indicated previously, if the back reflective element is a reflective polariser, given the imperfect nature of the latter it would be possible to arrange a light source at the back of it allowing better night visibility of the information displayed. If the back reflective element is of the metal type, it could advantageously be formed by dial 10.

According to another embodiment which is not shown, the two-colour display assembly according to the invention is arranged under crystal 4 when the back reflective element is an "imperfect" reflective polariser PR$_2$ allowing a second display, located on the dial, such as an analogue display to be observed. If the back reflective element is of the metal type, the display assembly according to the invention may be split in a way, keeping for example first device I determining the first colour under the crystal, and arranging second device II determining the second colour on the dial.

What is claimed is:

1. A two-colour display assembly including on the one hand a first device determining a first colour, said device being formed of a liquid crystal display module, the switching configurations of which are determined by an electronic control unit powered by an energy source, said module including a first linear polariser at the front and a second linear polariser, at least one of the two polarisers being selective of said first colour, and on the other hand a second device II including a coloured filter corresponding to the second colour, wherein the axes of polarisation of the polarisers of the first device are parallel to each other, in that the coloured filter of the second device includes at the front a reflective polariser whose axis of polarisation is parallel to the axes of polarisation of the two polarisers of the first device I, and at the back a reflective element and in that the control unit enables a switching configuration to be defined displaying an item of information in the first colour on a background corresponding to the second colour or vice versa.

2. A display assembly according to claim 1, wherein the reflective element of the second device is either a second reflective polariser crossed with the front reflective polariser or a transflective polariser.

3. A display assembly according to claim 2, wherein it further includes at the back of the second device, either a second display, or a light source.

4. A display device according to claim 1, wherein the reflective element of the second device is a metal reflector.

5. A display assembly according to claim 1, wherein the two polarisers of the first device are both selective of the first colour.

6. A display assembly according to claim 1, wherein the display module includes a single matrix or segment liquid crystal cell providing a two-colour display in the switched on state.

7. A display assembly according to claim 1, wherein the display module includes a first matrix or segment liquid crystal cell and an optical valve formed by a second liquid crystal cell the switching of which from an ON state to an OFF state or vice versa enables the colour of the information displayed to be reversed with that of the background on which it is displayed, when the display cell is in the ON state.

8. A two-colour display assembly according to claim 7, wherein the valve includes at least two distinct zones which can be switched separately and enable display zones with chromatic inversion to be obtained on the same display assembly, when they have opposite switching configurations.

9. A display assembly according to claim 1, wherein the front reflective polariser of the second device includes totally transparent zones allowing a mixture of the first and second colours.

10. A display assembly according to claim 1, wherein the coloured filter is a lacquer applied to the back face of the reflective polariser or to the front face of the reflective element of the second device, or incorporated in the material thereof.

11. A display assembly according to claim 1, wherein the liquid crystals of the display module are selected from among liquid crystals of the twisted nematic type with positive or negative anisotropy and of the two frequency type.

12. A display assembly according to claim 1, wherein the first and second colours are complementary colours.

13. A timepiece including a case, closed by a crystal and a back cover, in which a watch movement is housed intended to give time-related information on a dial located between the crystal and the back cover, wherein the dial includes a display assembly according to claim 1, or it is merged with said display assembly to display time-related or non-time-related information of sensor systems contained in the case of said timepiece.

14. A timepiece including a case, closed by a crystal and a back cover, in which a watch movement is housed intended to give time-related information on a dial located between the crystal and the back cover, wherein the inner face of the crystal includes a display assembly according to claim 2 or it is merged with said display assembly to display time-related or non-time-related information of sensor systems contained in the case of said timepiece.

15. A timepiece including a case, closed by a crystal and a back cover, in which a watch movement is housed intended to give time-related information on a dial located between the crystal and the back cover, wherein it further includes a display assembly according to claim 4, wherein the device determining the first colour is supported by the inner face of the crystal or is merged with it and the device determining the second colour is supported by the dial or merged therewith.

16. A timepiece according to claim 13, wherein the dial includes an analogue time display.

17. A timepiece according to claim 14, wherein the dial includes an analogue time display.

18. A timepiece according to claim 15, wherein the dial includes an analogue time display.

* * * * *